(12) United States Patent
van Wijk et al.

(10) Patent No.: US 8,099,884 B2
(45) Date of Patent: Jan. 24, 2012

(54) IDENTIFICATION DEVICE AND METHOD FOR MANUFACTURING THEREOF

(75) Inventors: Antoon van Wijk, Brasschaat (BE); Bart Louis Maria Verlinden, Hombeek (BE)

(73) Assignee: Allflex Europe SAS, Vitre (FR)

( * ) Notice: Subject to any disclaimer, the term of this patent is extended or adjusted under 35 U.S.C. 154(b) by 720 days.

(21) Appl. No.: 11/664,954

(22) PCT Filed: Oct. 20, 2005

(86) PCT No.: PCT/BE2005/000148
§ 371 (c)(1),
(2), (4) Date: Dec. 1, 2008

(87) PCT Pub. No.: WO2006/045162
PCT Pub. Date: May 4, 2006

(65) Prior Publication Data
US 2009/0077844 A1    Mar. 26, 2009

(51) Int. Cl.
*G09F 3/00* (2006.01)
(52) U.S. Cl. .......................................... 40/301; 425/542
(58) Field of Classification Search .................... 40/301; 425/542
See application file for complete search history.

(56) References Cited

U.S. PATENT DOCUMENTS

| | | | | |
|---|---|---|---|---|
| 3,388,492 A * | 6/1968 | Nichols, Jr. | ..................... | 40/301 |
| 3,731,414 A * | 5/1973 | Murphy et al. | ................. | 40/301 |
| 4,920,671 A * | 5/1990 | Zatkos | ............................ | 40/301 |
| 5,768,813 A * | 6/1998 | Reboul et al. | .................. | 40/301 |
| 6,145,226 A   | 11/2000 | Finlayson | | |
| 6,385,877 B1* | 5/2002 | Wikan | ............................ | 40/301 |
| 6,501,430 B1* | 12/2002 | Esselink | ...................... | 343/718 |

FOREIGN PATENT DOCUMENTS
| | | |
|---|---|---|
| DE | 29812383 | 10/1998 |
| FR | 2635437 | 2/1990 |
| WO | 9322907 | 11/1993 |

OTHER PUBLICATIONS

European Search Report for co-pending Belgian Application No. BE2005/000148; 1 page.

* cited by examiner

*Primary Examiner* — Gary Hoge
(74) *Attorney, Agent, or Firm* — Meyertons, Hood, Kivlin, Kowert & Goetzel, P.C.; Eric B. Meyertons

(57) ABSTRACT

Device for identifying articles such as animals, comprising a male part and a female part, which male part comprises an arrow-shaped element and which female part is provided with a passage with a front end and a rear end, wherein the arrow-shaped element can be inserted into the passage along the front end, wherein the passage is provided close to the front end with at least one protruding element, and wherein the passage is partly closed close to the rear end by a closing part, wherein the partly closed passage, including the protruding element, are manufactured integrally from a hard material; method for manufacturing such a device.

14 Claims, 7 Drawing Sheets

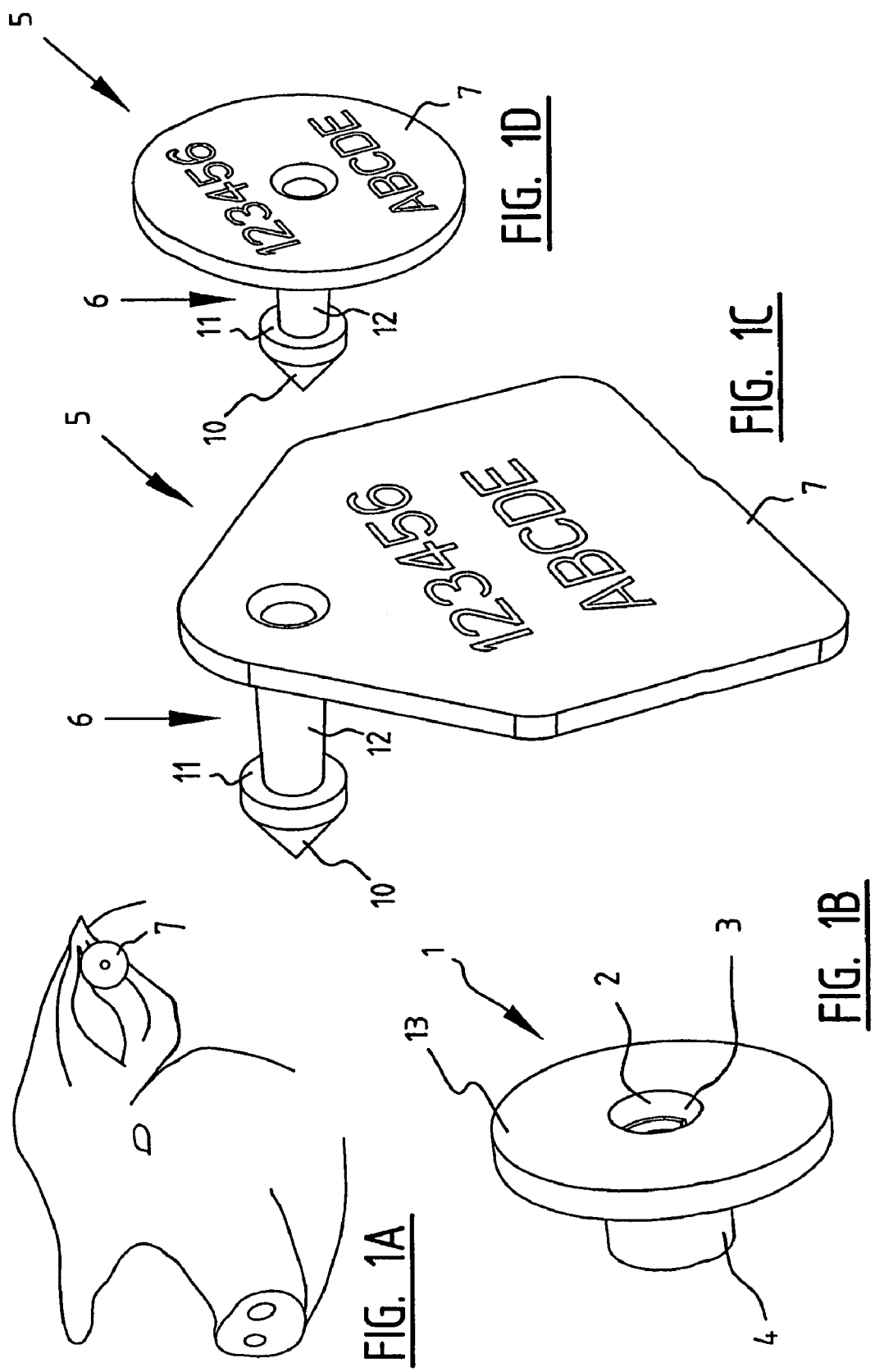

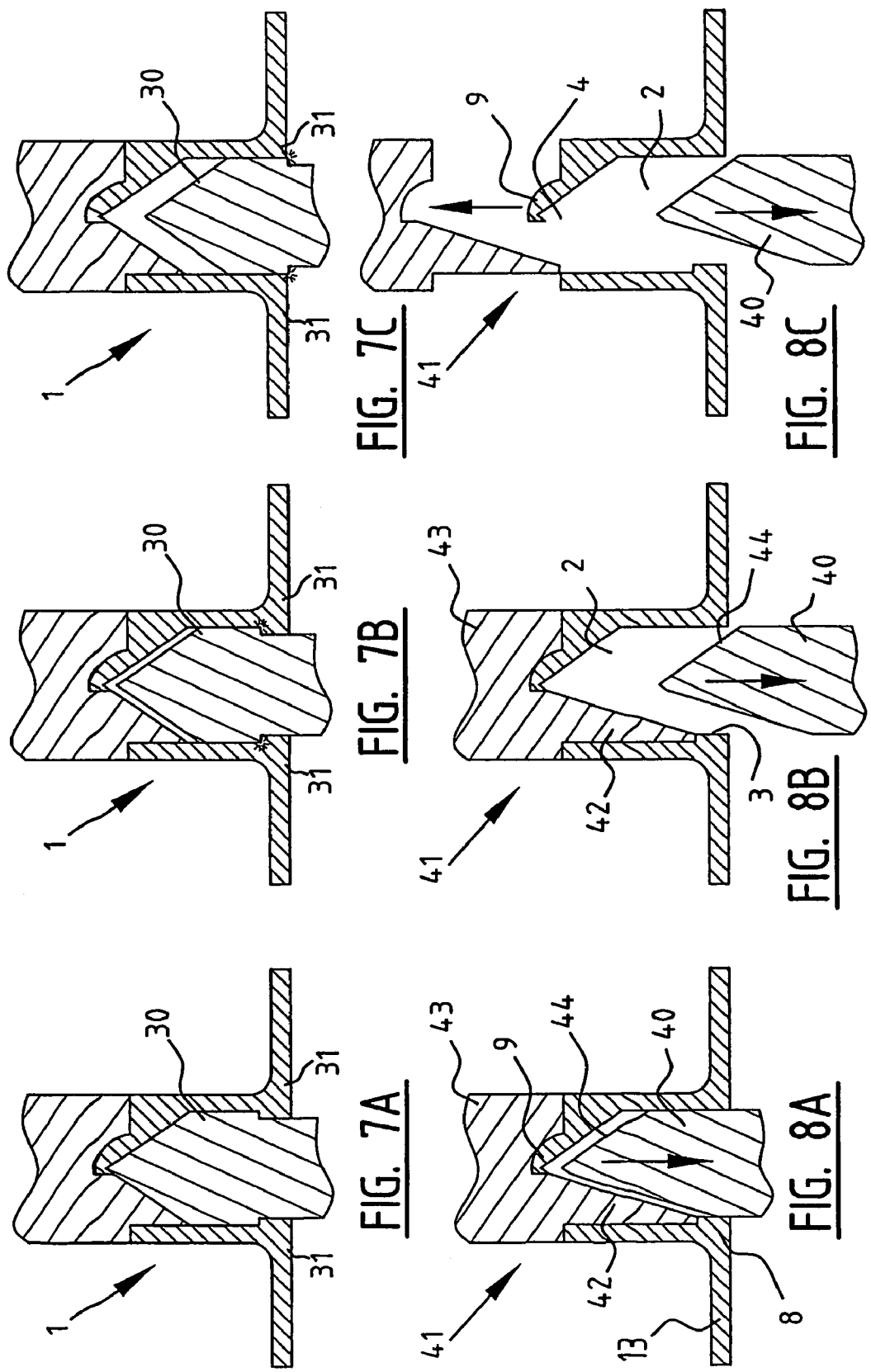

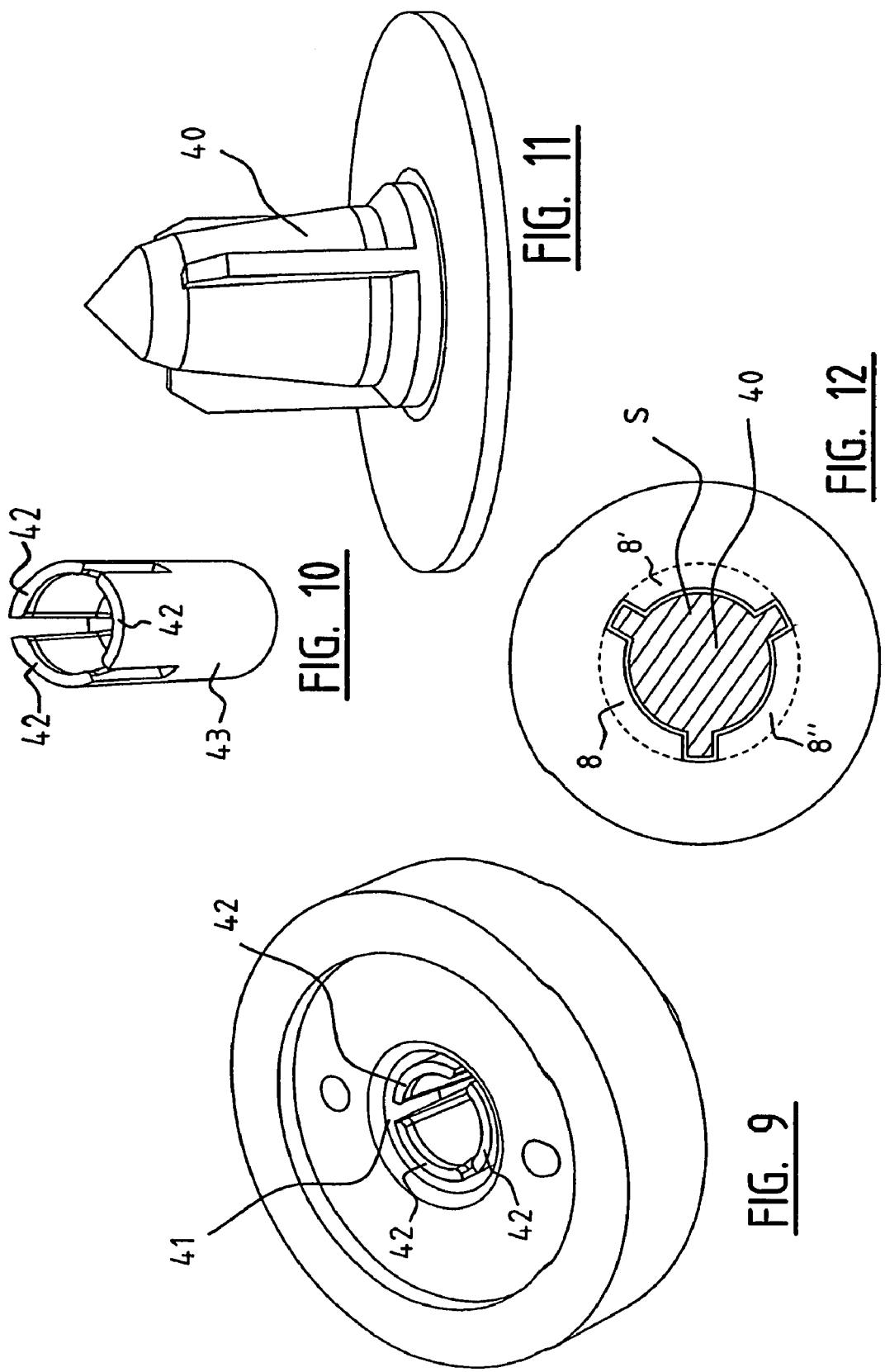

IDENTIFICATION DEVICE AND METHOD FOR MANUFACTURING THEREOF

The present invention relates to a device for identifying articles such as animals, comprising a male part and a female part, which male part comprises an arrow-shaped element and which female part is provided with a passage with a front end and a rear end, wherein the arrow-shaped element can be inserted into the passage along the front end and wherein the passage is provided close to the front end with at least one protruding element. The invention further relates to a female part for use in such a device, to a method for manufacturing the female part of such a device, wherein the female part is manufactured by injection moulding using a multipart mould, and to a method for arranging an electronic transponder comprising at least one electronic component and an antenna winding in a part of hard plastic material.

Such devices are for instance described in EP 0 941 656, EP 1 161 139 and EP 0 639 942. In general the existing devices have the drawback of being relatively heavy, since the female part, which must be quite strong, is constructed from a plurality of components. Furthermore, the known embodiments are generally not fully fraud-proof or tamper-proof, wherein tamper-proof is specified in different ear tag regulations as: "the ear tag must display visible signs of any attempt at fraud".

EP 0 639 942 shows in the figures an ear tag of the type stated in the preamble with a female part with a passage, the rear end of which is wholly open.

The invention has for its object to provide a device and method of the type stated in the preamble, which device has a low weight and is tamper-proof, and which methods are easy to carry out.

The invention provides for this purpose a device which is distinguished in that the passage is partly closed close to the rear end by a closing part, wherein the partly closed passage, including the protruding element, are manufactured integrally from a hard material. In this manner the arrow-shaped element can be inserted into the passage via the front end of the passage, wherein the at least one protruding element, as seen in the direction from the front end to the rear end of the passage, will engage behind the tip part of the arrow-shaped element and in this manner prevent removal of the arrow-shaped element back along the front end. Because the passage is partly closed near the rear end, it will not be possible either to remove the arrow-shaped element along this rear end, such that a tamper-proof device is obtained which cannot be reused. By manufacturing the passage, including the protruding element, integrally a relatively light device can moreover be obtained.

The hard material from which the device is manufactured is preferably a hard plastic such as acrylonitrile styrene acrylate (ASA) or polycarbonate (PC). Any other suitable hard material, such as aluminium, does however also lie within the scope of the invention.

If the device is used as an ear tag for animals, according to a possible embodiment the female part then weighs less than 3 grammes. There are different national regulations wherein a maximum weight for the ear tags is set for different types of animal. By keeping the weight of the female part as low as possible, it is possible to meet these requirements for the different types of animal. For pigs for instance, a maximum weight of only 4 grammes is permitted for piglets for the whole ear tag (male and female part). For cattle this maximum weight is 12 grammes. This is particularly important for animals in which the ear tag is already arranged at a very young age.

In the case that the device is used as an ear tag for animals, the maximum diameter of the arrow-shaped element is further preferably equal to or greater than the diameter of the passage, such that the ear tag retains an anvil effect during tagging so as to prevent crushing of the ear tissue.

According to a possible embodiment, the female part is substantially disc-shaped, wherein the passage is arranged substantially centrally on the disc. This is an advantageous design which is particularly suitable for ear tags.

According to a further feature of the invention, an electronic transponder comprising at least one electronic component and an antenna winding is incorporated in the female part. In this manner a code coupled to the ear tag can be programmed in the electronic component and read in simple manner using an electronic reader. Such an electronic transponder is for instance described in EP 0 941 656.

According to the preferred embodiment of the invention, two or more protruding elements are arranged close to the front end, spread regularly along the periphery of the passage. It is further recommended that the perpendicular projections of the protruding parts and of the closing part onto a plane perpendicular to the longitudinal direction of the passage substantially do not overlap each other. As will further be found from the figure description, this has considerable advantages in the performing of the method according to the invention, particularly in respect of the design of the mould components.

The method according to the invention is distinguished in that
 a first mould component is provided with a size and shape smaller than those of the passage for forming, wherein the cross-section is smaller than or equal to the smallest cross-section of the passage;
 a second mould component is arranged above the first mould component, which component has a lower part which together with the first mould component has substantially the shape and size of the passage, and an upper part which together with the top side of the first mould component bounds a space for the closing part;
 hard material is arranged around these mould components by injection moulding in order to form the passage of the female part;
 the first mould component is removed along the front end of the passage;
 the second mould component is removed along the rear end of the passage.

As will be elucidated in detail on the basis of the exemplary embodiment of FIGS. 8A-8C, this method allows a device according to the invention to be made from a hard plastic material, wherein it is particularly possible to integrally manufacture the passage with the protruding parts on one side and the closing part on the other side by injection moulding.

Note that this method is particularly intended for manufacturing a female part from a hard plastic material. For manufacture of a female part from a soft plastic material, such as for instance thermoplastic polyurethane (TPU), it would after all be possible to suffice with one mould component having the shape and size of the passage without a second mould component being necessary. This will be further elucidated with reference to FIGS. 7A-7C.

According to a preferred embodiment of the method according to the invention, the form and size of the first mould component resembles as closely as possible that of the first passage, but the at least one protruding part and the first mould component, as seen in a projection onto a plane perpendicular to the longitudinal direction of the passage, do not_ overlap each other. In this way the first mould component can be removed without problem along the front end of the passage.

It is further recommended that the lower part of the second mould component and the closing part, as seen in the projection onto a plane perpendicular to the longitudinal direction of the passage, do not overlap each other. In this way the second mould component can be removed without problem along the rear end of the passage.

According to a further developed embodiment, an electronic transponder comprising at least one electronic component and an antenna winding is arranged prior to the injection moulding in a space bounded by the multipart mould, into which space hard material is injected. The electronic transponder is preferably held by mould pins which retract during the injection moulding. In this manner a female part incorporating an electronic transponder can be manufactured in one process from hard plastic material.

Finally, the present invention relates to a method for arranging an electronic transponder comprising at least one electronic component and an antenna winding in a part of hard plastic material, wherein a plastic material is injected around the transponder in order to form a layer which fully encloses the transponder, wherein this plastic material is chosen such that a firm connection to the hard plastic of the part results. In this way the electronic transponder is completely isolated from outside influences and secured in the female part in completely immobile manner.

According to a preferred embodiment the transponder is fixed, prior to the injection, against a surface of the part of hard plastic, for instance by clamping, gluing or covering with an optionally self-adhesive foil plate, whereafter the plastic material is injected against this surface.

The plastic material can be a hard plastic or a soft plastic, such as thermoplastic polyurethane, wherein the only condition is that this plastic material forms a good connection with the hard plastic of the part.

According to a possible embodiment, the electronic transponder is held by mould pins which retract during the injection moulding of the part of hard plastic, such that the whole part is injected from a hard plastic in one phase.

According to a possible embodiment of the method which is particularly suitable for an ear tag for animals, the part of hard plastic material has a substantially disc-shaped body which is provided substantially in the centre with a passage for receiving an arrow-shaped element, wherein the transponder is arranged in the disc-shaped body.

According to a further developed embodiment of this method, a disc-shaped surface with a peripheral edge and an inner edge is provided for the transponder, between which peripheral edge and inner edge the material is injected in order to form the disc-shaped body in which the transponder is incorporated.

The invention will be further elucidated on the basis of a number of exemplary embodiments of the device and methods according to the invention with reference to the accompanying drawings, in which:

FIG. 1A shows an embodiment of a device according to the invention fixed to the ear of a pig;

FIG. 1B shows a female part of an embodiment of a device according to the invention;

FIGS. 1C and 1D show two possible embodiments of a male part of a device according to the invention;

FIGS. 7A-7C illustrate the method for manufacturing a cavity in a female part from soft material, as according to the prior art;

FIGS. 8A-8C illustrate an embodiment of the method for manufacturing a cavity in a female part of a device according to the invention;

FIGS. 9 and 10 show perspective views of an embodiment of the second mould component for use in the method according to the invention;

FIG. 11 shows a perspective view of an embodiment of the first mould component for use in the method according to the invention;

FIG. 12 shows a cross-section through the first mould component close to the front end of the passage of the embodiment of FIG. 3.

Figure 2A:
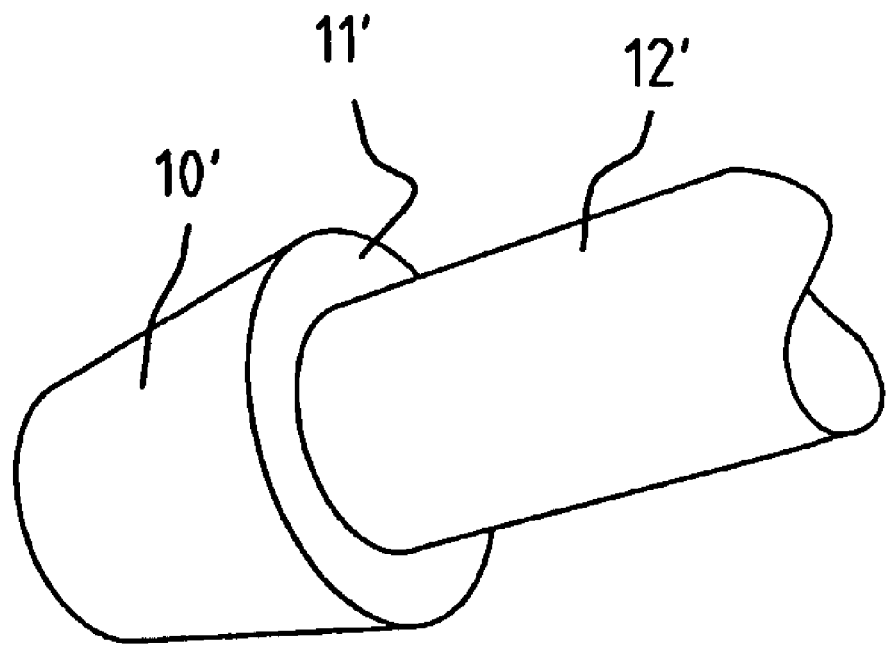
FIG. 2 shows two other possible embodiments of the arrow-shaped element of the male part of the device according to the invention.

The embodiments of the device according to the invention illustrated in the figures are specifically intended as ear tag for animals, more particularly small and large ruminants, pigs and other utility animals, but the skilled person will understand that analogous devices can be used just as well to identify other types of article.

FIGS. 1A-1D show an embodiment of the device for an application as ear tag for an animal.

FIG. 1B shows a female ear tag part 1 provided with a passage 2 having a front end 3 and a rear end 4. FIG. 1C shows a male part 5 of the ear tag which comprises an arrow-shaped element 6 to which is connected a plate-like element 7, on which plate-like element 7 can be arranged identification data.

FIG. 1D shows a second embodiment of male part 5 which is particularly suitable for pigs.

Figure 4:
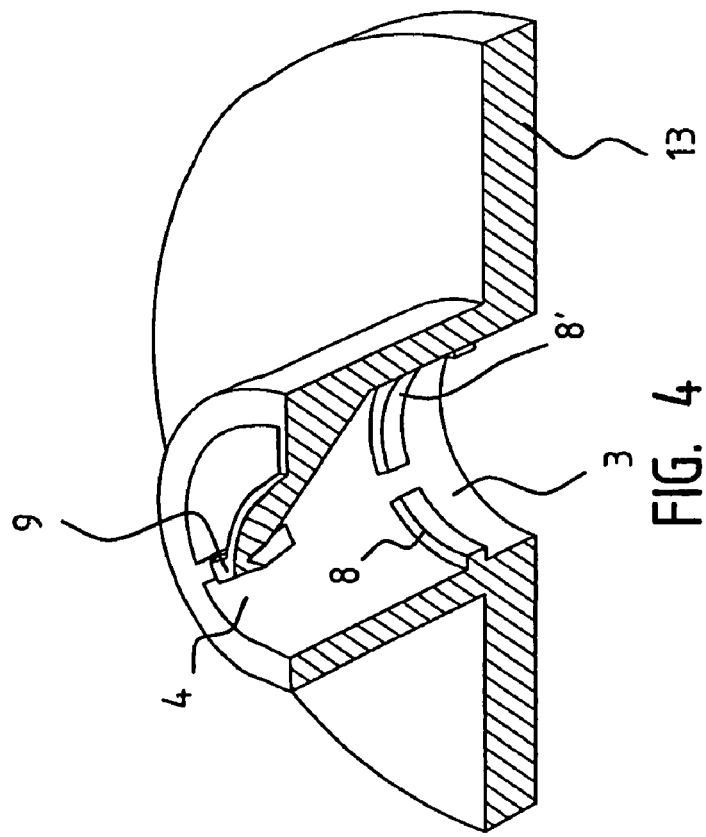
FIG. 4 shows the embodiment of FIG. 3 in section along line IV-IV.
Figure 3:
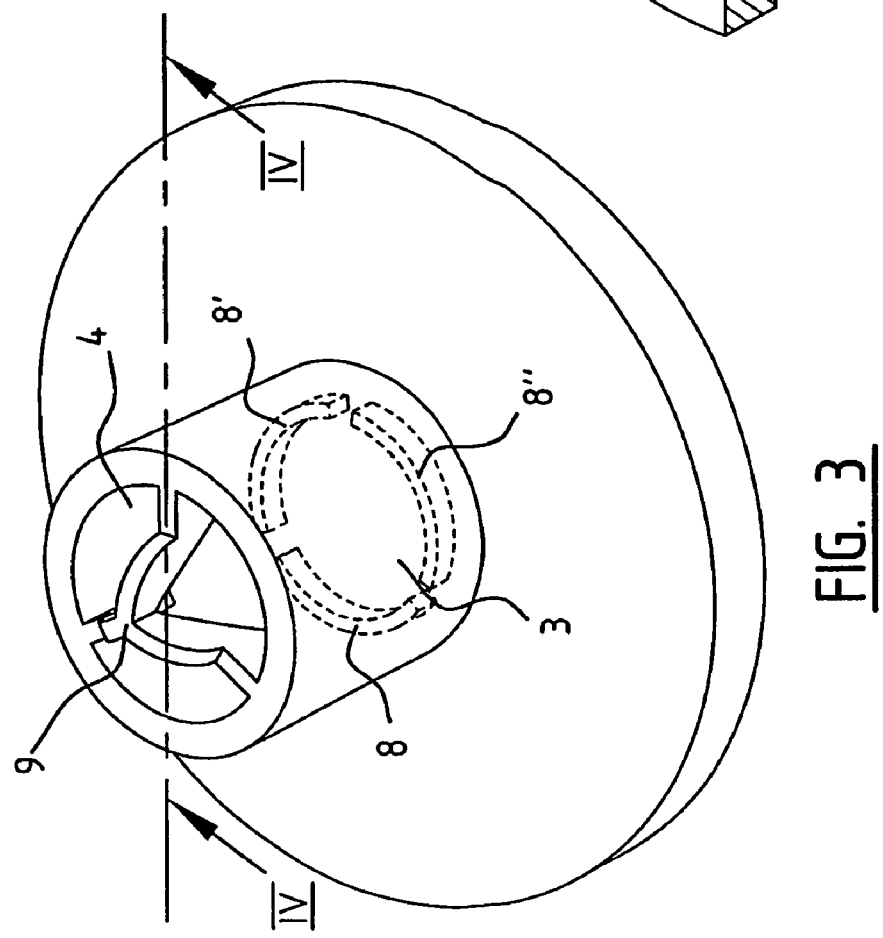
FIG. 3 is a perspective view of the embodiment of FIG. 1B as seen from the rear end.

Passage 2 of female ear tag part 1 is provided at its front end 3 with three protruding parts 8, 8', 8", as can be seen more clearly in FIG. 3. Close to rear end 4 the passage 2 is partly closed off by a closing part 9 which is more clearly visible in FIG. 4.

For fixing of the ear tag to the ear of an animal, the tip part 10 of arrow-shaped element 6 is pressed along the front end 3 into passage 2 until the tip part is situated behind protruding parts 8, 8', 8", as seen in the direction from the front end to the rear end of passage 2. These protruding parts 8, 8', 8" form stops for the rear side 11 of tip part 10, whereby tip part 10 cannot be taken back out of the passage. If an attempt were made to remove male part 5 from female part 1, the male part 5 would then break at the position of stem 12 of arrow-shaped element 6 and tip part 10 would remain behind in female part 1. Nor furthermore can this tip part 10 be removed along the rear end of passage 2, since this rear end is closed off by closing part 9. In this manner a fraud-proof or so-called "tamper-proof" ear tag is obtained, whereby reuse of either the female part or the male part is made impossible.

Further note that, since closing part 9 only partly closes the rear end 4 of the passage, ventilation still remains possible, which is important if tissue parts are entrained during tagging.

The female part 1 is for instance manufactured from a plastic with a hard, isolating quality such as ASA (acrylonitrile styrene acrylate), PC (polycarbonate) or the like. The male ear tag part 5 is generally manufactured from a soft plastic material such as TPU (thermoplastic polyurethane), such that the male ear tag part can be arranged in passage 2 of the female ear tag part 1 without it being necessary to exert much force, and stem 12 of the male ear tag part 5 breaks when the male and female ear tag parts are pulled apart.

So that the ear tag retains an anvil effect after tagging in order to avoid crushing of the ear tissue, the diameter of passage 2 is preferably smaller than or equal to the maximum diameter of the arrow-shaped element 6 of male part 5.

In the shown embodiment the female part has a substantially disc-shaped body 13, wherein passage 2 is arranged substantially centrally on disc-shaped body 13. The skilled person will however understand that female part 1 can also be formed without disc body 13 and that many other embodiments are possible. In the shown example this disc body 13 is formed integrally with the rest of female part 1.

It is of further importance to limit the weight of ear tags as much as possible. Ear tags are for instance arranged increasingly early on pigs, i.e. already on the day of birth or at 2 to 3 days old, whereby the maximum weight of the ear tag (male and female part together) may not exceed 4 grams according to Dutch standards. In the case of calves it is also obligatory in many countries to tag within 3 days of birth. It is thus a prerequisite that the female ear tag part is thin-walled and uses a minimum of plastic components. Because the shown embodiment of the female part is manufactured integrally from a hard plastic material, and not from two, three or more hard plastic components as in the prior art devices, such low weights can be achieved.

Figure 2B:
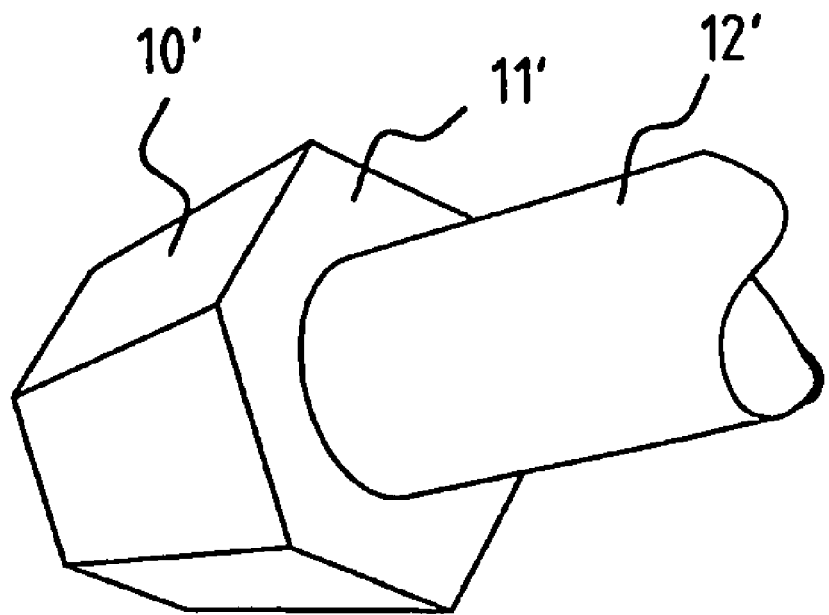

FIG. 2 shows a number of other possible embodiments of the arrow-shaped element of the male part which can be used for articles other than ear tags. If this is for instance a basket or other product in which an identification device must be fixed, it is in many cases not then essential for the tip part to have a real tip. What is important is that tip part 10' has a maximum diameter which is greater than the diameter of stem 12', such that tip part 10' has rear side 11' against which the protruding parts can engage, this in all positions of the male element in the female element.

Figure 5A:
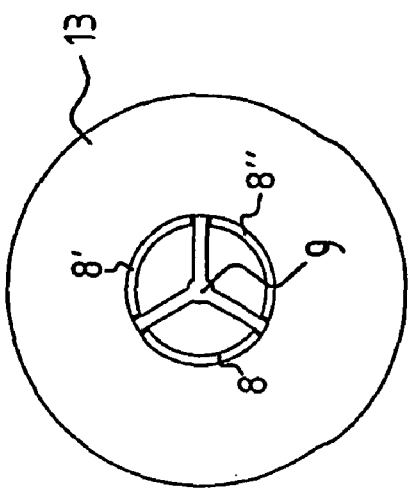
FIG. 5A is a top view of the embodiment of FIG. 4.
Figure 5B:
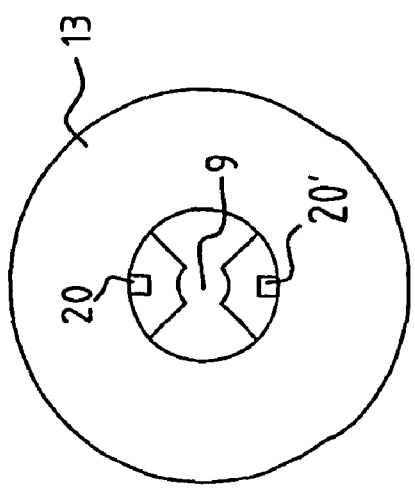
FIGS. 5B and 5C show top views of two other possible variants of the female part of the device according to the invention.
Figure 5C:
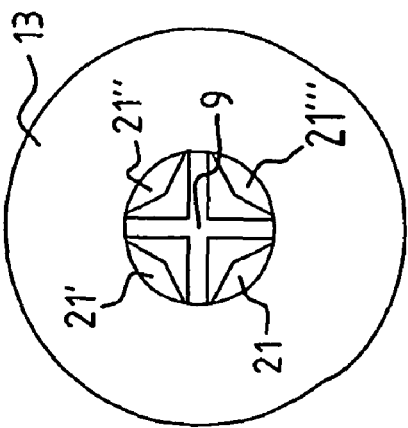

FIG. 5A shows a bottom view of female part 1 of FIG. 3, in which the three protruding parts 8, 8' and 8" can be clearly seen. FIGS. 5B and 5C show bottom views of two other possible variants. The variant of FIG. 5B has two protruding parts 20, 20', while the variant of FIG. 5C has four protruding parts 21, 21', 21", 21'''. Many other embodiments are thus possible, wherein all that is important is that means are provided which engage behind tip part 10 of arrow-shaped element 6.

Figure 6A:
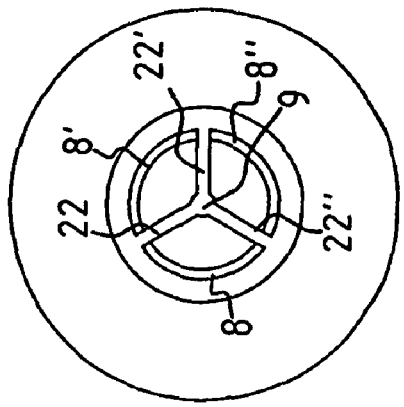
FIG. 6A is a bottom view of the embodiment of FIG. 4.

FIG. 6A shows a top view of the embodiment of FIG. 3. This figure clearly shows closing part 9, which is formed from three legs 22, 22', 22" which are connected at one end to the edge of passage 2 and come together at their other end in the centre of passage 2. In the top view the three protruding parts 8, 8' and 8" can be seen under legs 22, 22' and 22".

Figure 6B:
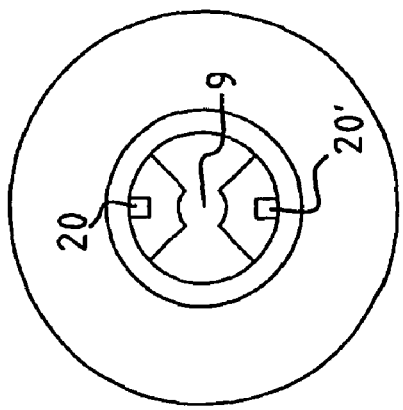
FIGS. 6B and 6C are bottom views of two other possible variants of the female part of a device according to the invention.
Figure 6C:
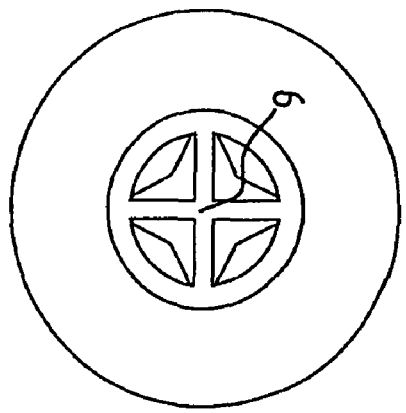

FIGS. 6B and 6C show two other possible variants. The skilled person will understand that many other embodiment variants of closing part 9 are possible, wherein the design must be such that tip part 10 of the arrow-shaped element cannot be removed from the female part along the rear end 4 of passage 2.

Further note that in the embodiment of FIGS. 1-4 the perpendicular projection onto a plane perpendicular to the longitudinal direction of passage 2 of the three protruding parts 8, 8', 8" and of closing part 9 do not overlap each other. This has the advantage that the method for manufacturing the ear tag can be performed with simplified mould components, as will be further shown in the description of FIGS. 8-11.

If it is desired to manufacture female part 1 from a soft plastic material, this can take place according to the prior art in a simple manner as illustrated in FIGS. 7A-7C. Provided for this purpose is a mould component 30 which has the size and shape of passage 2 of the female part. After injection moulding of the female ear tag part 1 it is easy to remove the mould component 30, also referred to as a forming tip, wherein the protruding parts 31 at the front end of the passage of deformable soft plastic can fold aside so that mould component 30 can be pulled freely out of the ear tag. With the use of a hard material the protruding parts no longer yield and these parts would break off if mould component 30 were removed. The technique of FIGS. 7A-7C can thus not be used for a female part of a hard material.

An embodiment of the method of the invention will now be illustrated with reference to FIGS. 8A-8C. This method makes use of two mould components 40, 41 instead of the mould component 30 of FIGS. 7A-7C:

- a first mould component 40 is provided with a size and shape smaller than those of the passage 2 to be formed, wherein the maximum cross-section S (see the hatched area in FIG. 12) is here equal to the smallest cross-section of passage 2, i.e. the cross-section of passage 2 at the position of protruding parts 8, 8', 8";
- above the first mould component 40 is arranged a second mould component 41 having a lower part 42 which, together with first mould component 40, has substantially the form and the size of passage 2, and having an upper part 43 which, together with the upper side 44 of first mould component 40, bounds a space for closing part 9;
- after hard material has been arranged around these mould components 40, 41 by injection moulding, as illustrated in FIGS. 8A-8C the first mould component can be removed along the front end 3 of passage 2 and the second mould component 41 can be removed along the rear end 4 of passage 2.

Additional mould components are of course also necessary to form the disc body 13 of female part 1, but these are deemed known and will not be further elucidated here. FIGS. 9-11 show further perspective views of the first and second mould components 40, 41.

Finally, the device according to the invention can be provided with an electronic transponder (an RF-tag) which comprises an electronic component and an antenna winding. In the case of an ear tag such a transponder is generally accommodated in female part 1, this such that it is fully sealed off from the outside environment. This transponder must after all be completely isolated against outside influences such as pig bites, sucking on the ear tags, and so on.

Figure 13:
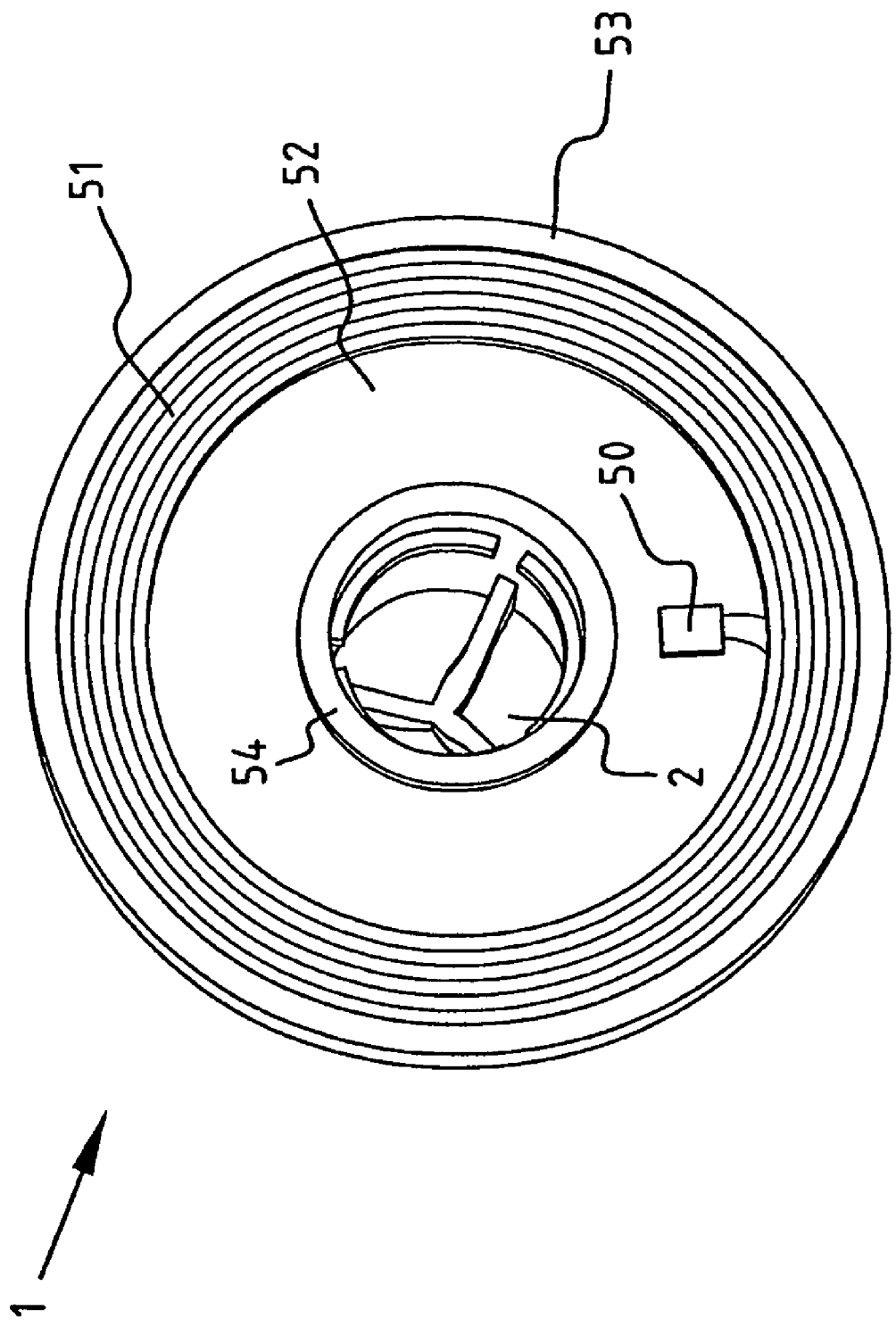
FIG. 13 shows a perspective view of a part of hard plastic material with a surface against which a transponder is fixed.

An embodiment of the method for arranging an electronic transponder in a female part of an ear tag will now be described with reference to FIG. 13. The electronic transponder comprises an electronic component 50 and an antenna winding 51. This transponder is placed on a surface of the female part 1 of hard plastic material wherein, in the variant of FIG. 13, this surface is a rear side 52 of a disc body. In the shown example the disc-shaped surface is provided with a peripheral edge 53 and an inner edge 54 around passage 2. This side 52 is fully sprayed with a hard plastic material. The plastic to be sprayed can be the same as that from which the first surface of the female part is made, or another plastic which forms a firm, protective connection to the first formed surface. This spraying generally takes place under very high pressure for maximum enclosure of the transponder, since it is a requirement for a stable communication with readers that chip 50 can move as little as possible.

Before spraying plastic material around the transponder it should preferably be secured in order to avoid displacement hereof during the spraying. This can take place in different ways, for instance by clamping, gluing or by covering with an optionally self-adhesive foil plate. According to yet another possibility, the transponder can be held by pins during the spraying, which pins can be retracted during the final stage of the spraying. After spraying of side 52 an ear tag part 1 is obtained which has the form of the female ear tag part as shown in FIG. 1B.

The invention is not limited to the embodiment variants described above on the basis of the figures, and the skilled person will appreciate that many modifications are possible without departing from the scope of the invention, this scope being defined solely by the appended claims.

The invention claimed is:

1. Device for identifying articles such as animals, comprising a male part and a female part, which male part comprises an arrow-shaped element and which female part is provided with a passage with a front end and a rear end, wherein the arrow-shaped element can be inserted into the passage along the front end, wherein the passage is provided close to the front end with at least one protruding element, characterized in that the passage is partly closed close to the rear end by a closing-part, wherein the partly closed passage, including the protruding element, are manufactured integrally from a hard material, wherein two or more protruding elements are arranged at the front end, spread regularly along the periphery of the passage.

2. Device as claimed in claim 1, wherein the hard material is acrylonitrile styrene acrylate (ASA) or polycarbonate (PC).

3. Device as claimed in claim 1, wherein the female part has a substantially disc-shaped body, wherein the passage is arranged substantially centrally on the disc-shaped body.

4. Device as claimed in claim 1, wherein an electronic transponder comprising at least one electronic component and an antenna winding is incorporated in the female part.

5. Device for identifying articles such as animals, comprising a male part and a female part, which male part comprises an arrow-shaped element and which female part is provided with a passage with a front end and a rear end, wherein the arrow-shaped element can be inserted into the passage along the front end, wherein the passage is provided close to the front end with at least one protruding element, characterized in that the passage is partly closed close to the rear end by a closing-part, wherein the partly closed passage, including the protruding element, are manufactured integrally from a hard material, wherein the perpendicular projections of the protruding parts and of the closing part onto a plane perpendicular to the longitudinal direction of the passage substantially do not overlap each other.

6. Device as claimed in claim 5, wherein the hard material is acrylonitrile styrene acrylate (ASA) or polycarbonate (PC).

7. Device as claimed in claim 5, wherein the female part has a substantially disc-shaped body, wherein the passage is arranged substantially centrally on the disc-shaped body.

8. Device as claimed in claim 5, wherein an electronic transponder comprising at least one electronic component and an antenna winding is incorporated in the female part.

9. Method for manufacturing the female part of a device for identifying articles such as animals, comprising a male part and a female part, which male part comprises an arrow-shaped element and which female part is provided with a passage with a front end and a rear end, wherein the arrow-shaped element can be inserted into the passage along the front end, wherein the passage is provided close to the front end with at least one protruding element, characterized in that the passage is partly closed close to the rear end by a closing-part, wherein the partly closed passage, including the protruding element, are manufactured integrally from a hard material, and wherein the female part is manufactured by injection moulding using a multipart mould, the method comprising:
  providing a first mould component with a size and shape smaller than those of the passage for forming, wherein the cross-section S is smaller than or equal to the smallest cross-section of the passage;
  arranging a second mould component above the first mould component, which second mould component has a lower part which, together with the first mould component, has substantially the shape and size of the passage, and an upper part which, together with the top side of the first mould component, bounds a space for the closing part;
  arranging a hard material around these mould components by injection moulding in order to form the passage of the female part;
  removing the first mould component along the front end of the passage;
  removing the second mould component along the rear end of the passage.

10. Method as claimed in claim 9, wherein the first mould component resembles as closely as possible the form of the passage, but wherein the at least one protruding part and the first mould component, as seen in a projection onto a plane perpendicular to the longitudinal direction of the passage, do not overlap each other.

11. Method as claimed in claim 9, wherein the lower part of the second mould component and the closing part, as seen in a projection onto a plane perpendicular to the longitudinal direction of the passage, do not overlap each, other.

12. Method as claimed in claim 9, wherein an electronic transponder comprising at least one electronic component and an antenna winding is arranged prior to the injection moulding in a space which is bounded by the multipart mould and into which hard material is subsequently arranged by injection moulding.

13. Method as claimed in claim 12, wherien the electronic transponder is held by mould pins which retract during the injection moulding.

14. Method as claimed in claim 12 wherein the female part has a substantially disc-shaped body, and wherein the passage is arranged substantially centrally on the disc-shaped body, and, wherein the electronic transponder is arranged prior to injection moulding in a cavity for the disc-shaped body formed by mould components.

* * * * *